United States Patent
Leatham et al.

(10) Patent No.: US 12,334,980 B2
(45) Date of Patent: Jun. 17, 2025

(54) INFORMATION SCRAMBLING SYSTEMS AND METHODS

(71) Applicant: Raytheon Company, Waltham, MA (US)

(72) Inventors: James G. Leatham, Los Angeles, CA (US); Michael M. Furusawa, Chino Hills, CA (US)

(73) Assignee: Raytheon Company, Arlington, VA (US)

( * ) Notice: Subject to any disclaimer, the term of this patent is extended or adjusted under 35 U.S.C. 154(b) by 195 days.

(21) Appl. No.: 18/061,316

(22) Filed: Dec. 2, 2022

(65) Prior Publication Data
US 2024/0187098 A1    Jun. 6, 2024

(51) Int. Cl.
| | |
|---|---|
| *H04B 10/85* | (2013.01) |
| *H04B 10/27* | (2013.01) |
| *H04B 10/40* | (2013.01) |
| *H04L 9/08* | (2006.01) |

(52) U.S. Cl.
CPC ............. *H04B 10/27* (2013.01); *H04B 10/40* (2013.01); *H04B 10/85* (2013.01); *H04L 9/0816* (2013.01)

(58) Field of Classification Search
CPC ........ H04B 10/40; H04B 10/85; H04L 9/0816
USPC .......................................... 398/39, 135, 183
See application file for complete search history.

(56) References Cited

U.S. PATENT DOCUMENTS

| | | | |
|---|---|---|---|
| 11,101,893 B2 | 8/2021 | Chan | |
| 2009/0136238 A1* | 5/2009 | Gill | ........................ H04B 10/85 398/159 |
| 2010/0074444 A1* | 3/2010 | Etemad | .................. H04B 10/85 380/42 |

(Continued)

FOREIGN PATENT DOCUMENTS

| | | | | |
|---|---|---|---|---|
| CA | 2038092 A1 * | 9/1991 | ......... | H04Q 11/0478 |
| CN | 112804044 A | 5/2021 | | |

OTHER PUBLICATIONS

International Search Report and Written Opinion of the International Searching Authority dated Jan. 8, 2024 in connection with International Patent Application No. PCT/US2023/074838, 11 pages.

(Continued)

*Primary Examiner* — Li Liu

(57) ABSTRACT

A method includes receiving an outgoing data stream and dividing the outgoing data stream to generate multiple electromagnetic signals in multiple channels using a first manifold. The method also includes modifying at least some of the electromagnetic signals in at least some of the channels to generate scrambled electromagnetic signals. The method further includes combining the scrambled electromagnetic signals to generate one or more outgoing scrambled combined electromagnetic signals using a second manifold. In addition, the method includes transmitting the one or more outgoing scrambled combined electromagnetic signals. The outgoing data stream may include an outgoing optical data stream, and a photonic integrated circuit may divide the outgoing optical data stream and produce scrambled optical signals. The photonic integrated circuit may be configured to handle outgoing optical data streams having different protocols and/or different data rates.

20 Claims, 9 Drawing Sheets

(56) References Cited

U.S. PATENT DOCUMENTS

| | | | | |
|---|---|---|---|---|
| 2010/0183309 A1* | 7/2010 | Etemad | ................ | H04J 14/007 398/79 |
| 2010/0277791 A1* | 11/2010 | Bratkovski | ............ | G02B 27/48 359/279 |
| 2011/0200192 A1* | 8/2011 | Etemad | .................... | H04L 9/12 380/256 |
| 2017/0293082 A1 | 10/2017 | Mower et al. | | |
| 2021/0409847 A1* | 12/2021 | Hinderth?r | .......... | H04J 14/0217 |

OTHER PUBLICATIONS

Falco et al., "Perfect secrecy cryptography via mixing of chaotic waves in irreversible time-varying silicon chips," Nature Communications, 2019, 11 pages.

Tarik et al., "Robust optical physical unclonable function using disordered photonic integrated circuits," Nanophotonics, Jan. 2020, 12 pages.

Ji et al., "10Gb/s two-user spatial diversity FSO-CDMA wiretap channel based on reconfigurable optical encoder/decoders," IEEE Access, Integrative Computer Vision and Multimedia Analytics, vol. 8, Feb. 2020, 9 pages.

* cited by examiner

OPTICAL
DATA
STREAM

INFORMATION SCRAMBLING SYSTEMS AND METHODS

TECHNICAL FIELD

This disclosure relates generally to communication systems. More specifically, this disclosure relates to information scrambling systems and methods that can be used to scramble/descramble information.

BACKGROUND

Numerous optical communication systems are used to transport data, sometimes very large amounts of data and sometimes over very large distances. Some optical communication systems transport data over physical transmission lines, such as fiber optic cables, while other optical communication systems transmit data through free space. The protection of data transmitted optically in both commercial and government systems is becoming more and more useful or important, even when that data is transmitted over physical transmission lines. Conventional approaches for protecting optical transmissions in optical systems often rely on dedicated encryption devices that perform encryption and decryption. However, dedicated encryption devices for optical systems are typically designed for use in specific applications with specific optical signals. As a result, the dedicated encryption devices often need to be updated or replaced each time the protocol or data rate of the optical signals is updated.

SUMMARY

This disclosure relates to information scrambling systems and methods.

In a first embodiment, a method includes receiving an outgoing data stream and dividing the outgoing data stream to generate multiple electromagnetic signals in multiple channels using a first manifold. The method also includes modifying at least some of the electromagnetic signals in at least some of the channels to generate scrambled electromagnetic signals. The method further includes combining the scrambled electromagnetic signals to generate one or more outgoing scrambled combined electromagnetic signals using a second manifold. In addition, the method includes transmitting the one or more outgoing scrambled combined electromagnetic signals.

In a second embodiment, an apparatus includes a first interface configured to receive an outgoing data stream. The apparatus also includes a first manifold configured to divide the outgoing data stream and generate multiple electromagnetic signals in multiple channels. The apparatus further includes multiple signal modifiers configured to alter at least some of the electromagnetic signals in at least some of the channels and generate scrambled electromagnetic signals. The apparatus also includes a second manifold configured to combine the scrambled electromagnetic signals and generate one or more outgoing scrambled combined electromagnetic signals. In addition, the apparatus includes a second interface configured to transmit the one or more outgoing scrambled combined electromagnetic signals.

In a third embodiment, an apparatus includes means for receiving an outgoing data stream. The apparatus also includes means for dividing the outgoing data stream to generate multiple electromagnetic signals in multiple channels. The apparatus further includes means for altering at least some of the electromagnetic signals in at least some of the channels to generate scrambled electromagnetic signals. The apparatus also includes means for combining the scrambled electromagnetic signals to generate one or more outgoing scrambled combined electromagnetic signals. In addition, the apparatus includes means for transmitting the one or more outgoing scrambled combined electromagnetic signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
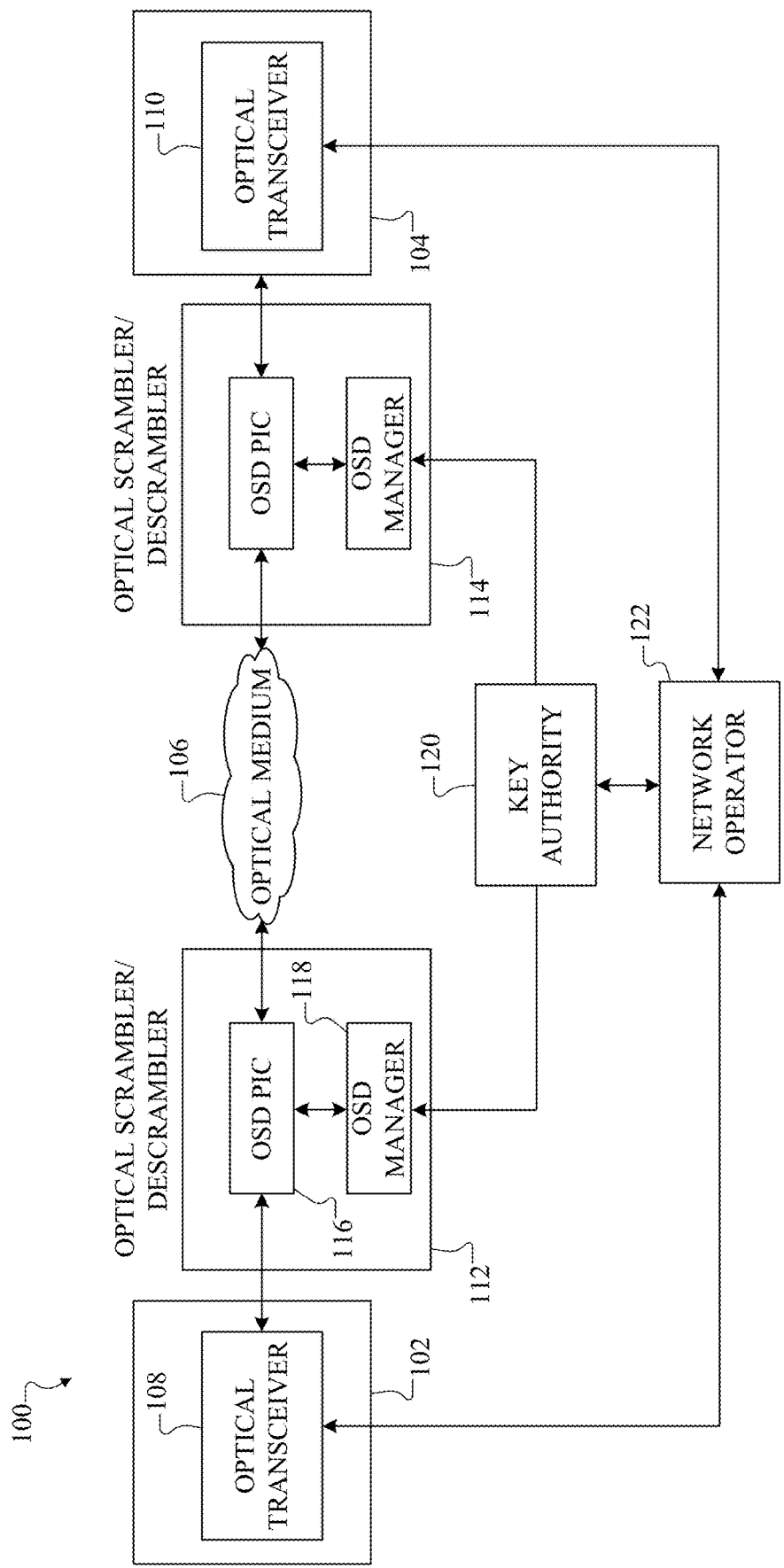
FIG. 1 illustrates an example optical information scrambling system according to this disclosure.

FIGS. 1 through 8, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, numerous optical communication systems are used to transport data, sometimes very large amounts of data and sometimes over very large distances. Some optical communication systems transport data over physical transmission lines, such as fiber optic cables, while other optical communication systems transmit data through free space. The protection of data transmitted optically in both commercial and government systems is becoming more and more useful or important, even when that data is transmitted over physical transmission lines. Conventional approaches for protecting optical transmissions in optical systems often rely on dedicated encryption devices that perform encryption and decryption. However, dedicated encryption devices for optical systems are typically designed for use in specific applications with specific optical signals. As a result, the dedicated encryption devices often need to be updated or replaced each time the protocol or data rate of the optical signals is updated.

This disclosure provides an optical information scrambling system and method. As described in more detail below, an optical scrambling device can include a first manifold that separates an optical data stream carrying data into multiple distinct branches, thereby forming multiple optical signals in multiple optical channels. The optical signals in the optical channels or combinations of optical channels can be manipulated independently, such as by independently applying amplitude modulations, phase modulations, delays, coherent combinations, or any combinations thereof in different optical channels or different combinations of optical channels. The types of modifications to the optical signals in the optical channels or combinations of optical channels may be applied consistently over time, or different types of modifications to the optical signals in the optical channels or combinations of optical channels may be applied during different periods of time (referred to as time slices). Also, the modifications to the optical signals in the optical channels or combinations of optical channels can occur in parallel, in series, or both, and different types of modifications can occur in different subarrays of the optical channels. The modifications that are performed by the optical scrambling device can be based on at least one private symmetric scrambling/descrambling (SD) key, and the result of this process is a scrambling of the optical signals. A second manifold can combine the scrambled optical signals from the various optical channels into one or more combined optical signals for transmission, such as via a physical transmission medium or via free space.

In some cases, an optical descrambling device may include the same components as the optical scrambling device, and the optical descrambling device can modify the optical signals in its optical channels in order to reverse the modifications to the optical signals created by the optical scrambling device. Effectively, the optical descrambling device unscrambles the scrambled optical signals received by the optical descrambling device. The modifications that are performed by the optical descrambling device can be based on the at least one private SD key. After descrambling, a recovered optical data stream can be output or further processed as needed or desired, such as to recover the data carried in the optical data stream. Note that bidirectional communication is also possible here, in which case multiple optical scrambling and descrambling devices can be provided and used. In some cases, each of the scrambling and descrambling devices may use the same manifolds and signal modifications to support the bidirectional communication.

In this way, the optical scrambling and descrambling devices provide a mechanism for protecting data being transmitted optically, and the mechanism may be implemented or positioned entirely within an optical communication channel. In other words, devices that are transmitting and receiving optical data streams need not have any knowledge of how the scrambling/descrambling is occurring or even that the scrambling/descrambling is occurring. The transmitting and receiving devices may not need to be configured to perform any of the optical scrambling/descrambling functionality. This allows the transmitting and receiving devices to be upgraded, replaced, or altered in their operation without requiring a redesign of the optical scrambling and descrambling devices. Also, these approaches provide "fogging" and "defogging" in an actual communication channel by scrambling and descrambling the optical signals themselves in the analog domain, as opposed to performing data encryption/decryption in the data domain. Data encryption and decryption can still be used, such as in the devices that are transmitting and receiving the optical data streams. Moreover, the optical scrambling and descrambling devices can protect the data that is being optically transmitted without requiring data conditioning and regardless of the protocol or data rate being used by the transmitting and receiving devices. As a result, the optical scrambling and descrambling devices can be used with a wide variety of data formats and transmission speeds, and there may be little or no need to update or replace the optical scrambling and descrambling devices when the data format or transmission speed changes. Further, the optical scrambling and descrambling devices can have negligible impact on the bit error rate or other quality measures of the optical signals being transmitted. In addition, in some cases, different SD keys may be securely exchanged between the optical scrambling and descrambling devices, such as by using quantum-resistant or post-quantum cryptographic public key exchange algorithms performed by a cryptographic processor (which would have a private-public key pair to perform this operation). The key exchange operation can use low bandwidth for transmission and can use any suitable technique to distribute the SD key, such as pre-placed key or public key exchange techniques. Finally, the optical scrambling and descrambling devices can support the use of high-bit encryption and decryption techniques, including the "one-time pad" approach where a different SD key is used during each time frame to encrypt/decrypt the optical signals.

FIG. 1 illustrates an example optical information scrambling system 100 according to this disclosure. As shown in FIG. 1, the system 100 generally supports optical communications between optical nodes 102 and 104 over an optical medium 106. Each node 102 and 104 represents a ground-, air-, or space-based system that can transmit and/or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other). The optical medium 106 represents any suitable medium over or through which optical signals can be transported, such as one or more fiber optic cables or free space.

The node 102 in this example includes an optical transceiver 108, which generally operates to produce outgoing optical signals for transmission to the node 104 and to process incoming optical signals received from the node 104. For example, the optical transceiver 108 may encode data onto the outgoing optical signals and decode data contained in the incoming optical signals. Similarly, the node 104 in this example includes an optical transceiver 110, which generally operates to produce outgoing optical signals for transmission to the node 102 and to process incoming optical signals received from the node 102. For instance, the optical transceiver 110 may encode data onto the outgoing optical signals and decode data contained in the incoming optical signals. As noted above, however, bidirectional communication is not necessarily required, in which case the node 102 may include an optical transmitter in place of the optical transceiver 108 and the node 104 may include an optical receiver in place of the optical transceiver 110 (or vice versa).

In order to provide increased security, optical scrambling/descrambling devices 112 and 114 can be used in the system 100. Each optical scrambling/descrambling device 112 and 114 is configured to receive and scramble optical signals being sent over the optical medium 106 and to descramble optical signals being received over the optical medium 106. Again, however, bidirectional communication is not necessarily required, in which case the optical scrambling/descrambling device 112 may perform only scrambling operations and the optical scrambling/descrambling device 114 may perform only descrambling operations (or vice versa). Each optical scrambling/descrambling device 112 and 114 may be implemented in any suitable manner. In some embodiments, for instance, each optical scrambling/descrambling device 112 and 114 may be implemented as a stand-alone device that is coupled to the associated optical transceiver 108 and 110 and to the optical medium 106. In other embodiments, each optical scrambling/descrambling device 112 and 114 may be implemented as a small form-factor pluggable (SFP) device that can be inserted into the associated optical transceiver 108 or 110 or other device and coupled to the optical medium 106. In still other embodiments, each optical scrambling/descrambling device 112 and 114 may be implemented using embeddable circuits, photonic application specific integrated circuits (ASICs), or other components.

In this example, each optical scrambling/descrambling device 112 and 114 includes an optical scrambler/descrambler (OSD) photonic integrated circuit (PIC) 116 and an OSD manager 118. Each OSD photonic integrated circuit 116 represents a device that integrates multiple photonic or light-based functions into a common structure. In the outgoing direction, each OSD photonic integrated circuit 116 can be used to split outgoing optical signals into multiple optical signals in multiple optical channels, modify the optical signals in different optical channels or different combinations of optical channels to scramble the outgoing optical signals, and recombine the scrambled optical signals into one or more combined optical signals that are transmitted over the optical medium 106. In the incoming direction, each OSD photonic integrated circuit 116 can be used to split incoming optical signals (which contain scrambled optical signals) into multiple optical signals in multiple optical channels, modify the optical signals in different channels or different combinations of optical channels to descramble the incoming optical signals, and recombine the descrambled optical signals into one or more combined optical signals that are output or further processed.

The OSD photonic integrated circuits 116 can provide a wide variety of modifications to outgoing optical signals in order to provide optical scrambling or to incoming optical signals in order to provide optical descrambling. For example, the OSD photonic integrated circuits 116 may be configured to apply amplitude modulations, phase modulations, delays, coherent combinations, or any combinations thereof to optical signals in different optical channels or different combinations of optical channels. The different optical channels or combinations of optical channels can be independently controlled, so the modifications that are performed on the optical signals in the different optical channels or combinations of optical channels can be separately controlled. In some cases, the optical signals in each individual optical channel can be modified independently of the optical signals in the other optical channels. In other cases, the optical signals in each subset of the optical channels can be modified independently of the optical signals in the other subsets of the optical channels. In still other cases, a combination of optical signal modifications in individual optical channels and subsets of optical channels may be used. In general, this disclosure is not limited to any particular types of optical signal modifications or to any particular applications of the optical signal modifications to the optical signals in the optical channels.

Moreover, in some cases, the types of modifications to the optical signals in the optical channels may be applied consistently over time, such as when only amplitude modulations and phase modulations are used in the optical channels. In other cases, different types of modifications to the optical signals in the optical channels may be applied during different time slices, such as when amplitude modulations are used in some time slices, phase modulations are used in other time slices, and a combination of amplitude and phase modulations are used in still other time slices. Again, in general, this disclosure is not limited to any particular types of optical signal modifications or to any particular techniques for changing the optical signal modifications that are applied to optical channels or combinations of optical channels.

Figure 2:
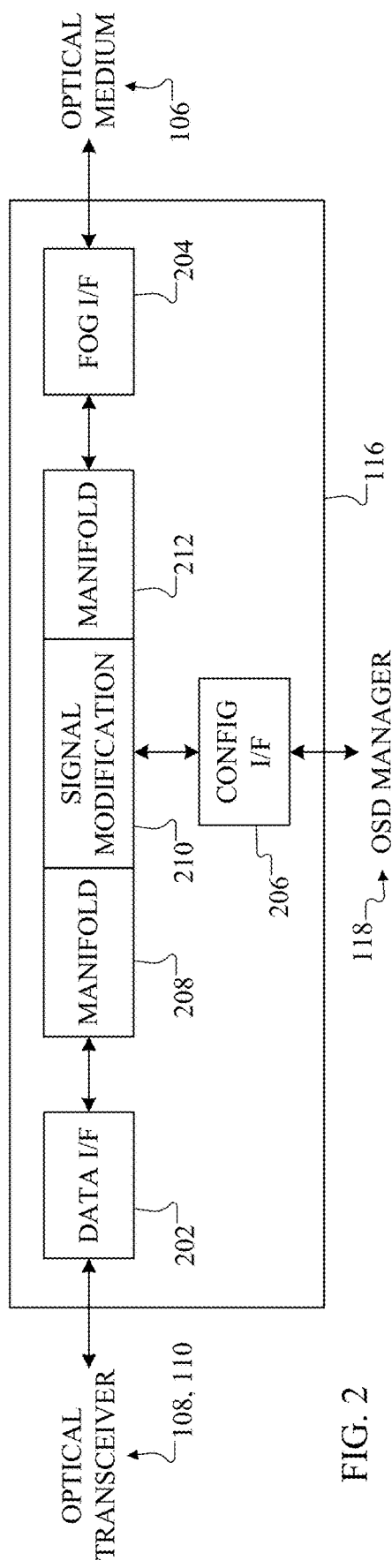
FIGS. 2 and 3 illustrate example components of optical scrambling/descrambling devices in an optical information scrambling system according to this disclosure.

Overall, the optical modifications that are performed by each OSD photonic integrated circuit 116 may be used to scramble the optical signals being transmitted over the optical medium 106 in the outgoing direction and to descramble the optical signals being received over the optical medium 106 in the incoming direction. The modifications that are performed by each OSD photonic integrated circuit 116 can be based on at least one private SD key. For example, each OSD photonic integrated circuit 116 may split incoming or outgoing optical signals into multiple optical signals in multiple optical channels, and the optical signals in individual optical channels or combinations of optical channels may be modified based on one or more bits in the associated private SD key. As a particular example, a large private SD key can be applied through amplitude modulations, phase modulations, and coherent signal combinations, such as via an exclusive-OR function applied to in-phase and quadrature components of optical signals or applied in successive time slices. When the same private SD key is available at both optical scrambling/descrambling devices 112 and 114, the modifications made by one optical scrambling/descrambling device 112 or 114 can be reversed by the other optical scrambling/descrambling device 114 or 112 using the private SD key. One example implementation of the OSD photonic integrated circuits 116 is shown in FIG. 2, which is described below.

Each OSD manager 118 represents one or more components used to control the private SD keys used by the corresponding OSD photonic integrated circuit 116. For example, each OSD manager 118 can performed functions related to key management, device configuration, and network management. As a particular example, each OSD manager 118 may execute key management software or other logic that decrypts and digitally verifies key material, software, and operating system (OS) data. Each OSD manager 118 can also modify the SD key data in order to support matrix operations or other operations in the OSD photonic integrated circuit 116.

Any suitable techniques may be used to provide SD keys to the OSD managers 118. In some embodiments, for example, each OSD manager 118 may be initially provisioned with one or more pre-placed SD keys, and each OSD manager 118 may interact with an external key authority 120 that can provide additional SD keys to the OSD manager 118 during periodic rekeying. Also, each private SD key may be used by the optical scrambling/descrambling devices 112 and 114 for any suitable length of time. In some cases, the same private SD key may be used for a prolonged period of time. In other cases, the OSD managers 118 may support the use of a key derivation algorithm that allows different SD keys to be produced over time for use by the optical scrambling/descrambling devices 112 and 114. Note, however, that the SD keys may be used in any other suitable manner. Also, in some embodiments, each OSD manager 118 may have access to and use a single private SD key or multiple private SD keys at any given time. If public key exchange is supported, multiple private SD keys may be securely exchanged, and each OSD manager 118 may be provisioned with one or more private-public key pairs to perform public key exchange operations with different OSD devices, such as when a satellite free space crosslinks with a different satellite. Note, however, that any other suitable techniques may be used to obtain and use private SD keys. In general, this disclosure is not limited to any particular mechanism for distributing SD keys or using SD keys. One example implementation of the OSD managers 118 is shown in FIG. 3, which is described below.

In some embodiments, a network operator 122 may be used in the system 100 to help manage the operations of the optical nodes 102 and 104 and other components in the system 100. For example, the network operator 122 may control when the optical nodes 102 and 104 can transmit or receive data over the optical medium 106 and control how the optical nodes 102 and 104 encrypt and decrypt (in the datadomain) data being transmitted between the optical nodes 102 and 104. The network operator 122 may also be responsible for initiating updates to the optical nodes 102 and 104 and for performing other maintenance functions. The network operator 122 may further be responsible for controlling one or more aspects of the optical scrambling/descrambling devices 112 and 114. In some cases, the network operator 122 may have a connection to or otherwise be able to interact with the key authority 120, which may allow the network operator 122 to request new SD keys, revoke SD keys, or initiate or perform other key-related functions.

Although FIG. 1 illustrates one example of an optical information scrambling system 100, various changes may be made to FIG. 1. For example, while only two optical nodes 102 and 104 are shown here, the system 100 may include any suitable number of optical nodes that engage in any suitable unidirectional, bidirectional, or other communications with each other. Also, each optical node of the system 100 may include any suitable number of optical transmitters, receivers, or transceivers. Further, the system 100 is shown in simplified form here and may include any number of additional components in any suitable configuration as needed or desired. In addition, optical information scrambling and descrambling may be used in any other suitable systems and devices.

Figure 3:
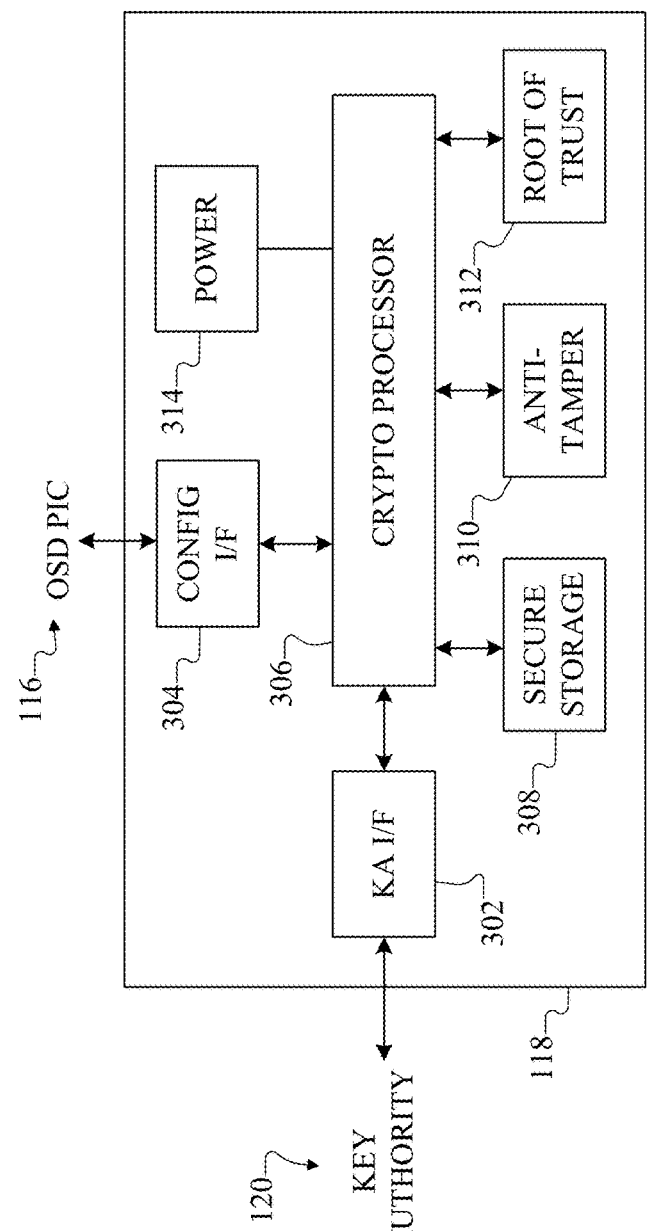

FIGS. 2 and 3 illustrate example components of optical scrambling/descrambling devices in an optical information scrambling system according to this disclosure. For ease of explanation, FIGS. 2 and 3 are described as illustrating components of the optical scrambling/descrambling devices 112 and 114 in the optical information scrambling system 100 of FIG. 1. However, the components shown in FIGS. 2 and 3 may be used in any other suitable devices and in any other suitable systems.

In FIG. 2, an example implementation of an OSD photonic integrated circuit 116 is shown. As shown in FIG. 2, the OSD photonic integrated circuit 116 includes two optical interfaces, namely a data interface 202 and a fog interface 204. The data interface 202 is configured to be optically coupled to an associated optical transceiver 108 or 110, such as via a direction connection or an indirect connection via another component, and to exchange optical signals with the optical transceiver 108 or 110. For example, in the outgoing direction, the data interface 202 is configured to receive optical signals (such as signals containing data) from the optical transceiver 108 or 110 and to provide the optical signals to other components of the OSD photonic integrated circuit 116 for scrambling. In the incoming direction, the data interface 202 is configured to receive optical signals that have been descrambled by other components of the OSD photonic integrated circuit 116 and to provide those optical signals to the optical transceiver 108 or 110. The interface 202 includes any suitable structure configured to be optically coupled to another device or an optical transmission medium.

Similarly, the fog interface 204 is configured to be optically coupled to the optical medium 106, such as via a direction connection or an indirect connection via another component, and to exchange optical signals with the optical medium 106. For example, in the outgoing direction, the fog interface 204 is configured to provide optical signals as scrambled by other components of the OSD photonic integrated circuit 116 for transmission over the optical medium 106. In the incoming direction, the fog interface 204 is configured to receive optical signals that have been scrambled and to provide the optical signals to other components of the OSD photonic integrated circuit 116 for descrambling. The interface 204 includes any suitable structure configured to be optically coupled to another device or an optical transmission medium.

The OSD photonic integrated circuit 116 further includes a configuration interface 206, which is configured to communicate with the corresponding OSD manager 118. The configuration interface 206 allows the corresponding OSD manager 118 to configured one or more operations of the OSD photonic integrated circuit 116, such as when the corresponding OSD manager 118 can use the configuration interface 206 to configure the OSD photonic integrated circuit 116 for use with different SD keys. The configuration interface 206 includes any suitable structure configured to receive configuration data or otherwise interact with a component that manages the OSD photonic integrated circuit 116.

In addition, the OSD photonic integrated circuit 116 includes a first manifold 208, a signal modification block 210, and a second manifold 212. In the outgoing direction, the first manifold 208 receives an outgoing optical data stream from the associated optical transceiver 108 or 110 via the data interface 202, where the outgoing optical data stream contains one or more optical signals (such as one or more optical signals carrying data). The first manifold 208 generally operates to separate the outgoing optical data stream into multiple distinct branches to form multiple optical signals in multiple optical channels. For example, the first manifold 208 may include a primary waveguide that receives an outgoing optical data stream and various combiners/splitters that divide the outgoing optical data stream into separate optical signals following separate optical pathways in various optical channels through the first manifold 208.

The signal modification block 210 generally operates to modify the optical signals in the optical channels as provided by the first manifold 208. For example, the signal modification block 210 may include amplitude modulators, phase modulators, delay elements, coherent combiners, or other signal processing elements configured to modify one or more characteristics of the optical signals in the optical channels. The modifications made to the one or more characteristics of the optical signals in the optical channels by the signal modification block 210 can be controlled by the corresponding OSD manager 218 via the configuration interface 206. As noted above, the modifications can occur independently in different optical channels, different combinations of optical channels, or both. In this way, the signal modification block 210 scrambles the optical signals in the various optical channels.

The second manifold 212 receives the scrambled optical signals from the signal modification block 210. The second manifold 212 generally operates to combine the scrambled optical signals from the optical channels into one or more combined optical signals for transmission over the optical medium 106. For example, the second manifold 212 may include various combiners/splitters that combine the scrambled optical signals into one or more scrambled combined signals and a primary waveguide that transports the one or more scrambled combined signals for output via the fog interface 204. In some cases, the second manifold 212 can have a 1:1 correspondence with the first manifold 208, meaning the number of optical channels created by the first manifold 208 equals the number of optical channels combined by the second manifold 212.

In the incoming direction, similar operations may occur in reverse. That is, the second manifold 212 may receive one or more scrambled combined signals from the optical medium 106 via the fog interface 204 and split the one or more scrambled combined signals into multiple optical signals in multiple optical channels. The signal modification block 210 can modify the optical signals in the optical channels in order to descramble the optical signals, and the first manifold 208 can combine the descrambled optical signals to produce a recovered optical data stream that is provided to the associated optical transceiver 108 or 110 via the data interface 202.

In FIG. 3, an example implementation of an OSD manager 118 is shown. As shown in FIG. 3, the OSD manager 118 includes two interfaces, namely a key authority (KA) interface 302 and a configuration interface 304. The key authority interface 302 is configured to communicate with the key authority 120 in order to securely receive SD keys, key revocations, software, public key trust anchors, or other information from the key authority 120. One specific example of a key authority 120 is the U.S. government's Key Management Infrastructure (KMI) system. The configuration interface 304 is configured to communicate with the corresponding OSD photonic integrated circuit 116. The configuration interface 304 allows the OSD manager 118 to configure one or more operations of the corresponding OSD photonic integrated circuit 116, such as when the OSD manager 118 can use the configuration interface 304 to configure the OSD photonic integrated circuit 116 to use different SD keys.

The OSD manager 118 also includes a cryptographic processor 306, which includes or is used in conjunction with a secure storage 308, an anti-tamper mechanism 310, and a root of trust 312. The cryptographic processor 306 represents a secure processor that can be used to process SD key-related data and protect against unauthorized access to SD keys. Among other things, the cryptographic processor 306 can receive and store SD keys and use the SD keys to configure the corresponding OSD photonic integrated circuit 116. The cryptographic processor 306 can encrypt and store data (including SD keys), application software that communicates with the key authority 120, and software/firmware instructions in the secure storage 308, which may represent a Flash memory, volatile random access memory, or other memory. The anti-tamper mechanism 310 may include one or more physical countermeasures or sensors that can detect attempts to probe or otherwise gain unauthorized access to SD keys or other data. If detected, the anti-tamper mechanism 310 may clear the SD keys or other data or take other suitable protective actions. Depending on the implementation, the anti-tamper mechanism 310 may be passive (such as by using tamper labels), active (such as by using switches or break-wire sensors), or both. The root of trust 312 represents a hardware or software/firmware component that helps to ensure the cryptographic processor 306 boots to a trusted state where software can be decrypted and authenticated. In addition, the OSD manager 118 includes a power supply 314, which may represent any suitable source of electrical power like one or more batteries or supercapacitors. The power supply 314 can help the anti-tamper mechanism 310 or other components of the OSD manager 118 continue to operate without primary power or when removed from other equipment.

As can be seen here, the optical scrambling/descrambling devices 112 and 114 can support high-bit cipher methodologies that can be used with multiple data formats and transmission speeds. The optical scrambling/descrambling devices 112 and 114 can be located entirely in an optical communication channel and may not require interactions with data formats or data types (unlike prior data encryption techniques). At least one of the optical scrambling/descrambling devices 112 and 114 can separate an optical bitstream into multiple independently-accessible parallel optical channels, which are used to scramble optical signals (such as sequentially, in parallel, or a combination of both). The optical signals can be scrambled along one or multiple vectors (such as time, frequency, phase, and/or spectral vectors) at high resolution with high fidelity and control through use of a private SD key, and the scrambled optical signals can be recombined for transmission. At least one of the optical scrambling/descrambling devices 112 and 114 can descramble the optical signals in order to recover the optical bitstream. These approaches can enable the application of SD keys in the optical domain without affecting the data format, such as by not requiring access to wavelength division multiplexing (which may already be required by the data format, like in dense wavelength division multiplexing systems). These approaches enable substantially maintaining signal levels (such as signal-to-noise ratios) while also dividing a signal stream into independent parallel optical channels that are individually manipulated (keyed). These techniques enable high-bit encryption, possibly up to the "one-time pad" limit. In-channel optical scrambling is also expected not to be susceptible to quantum computing threats.

Note that this type of functionality may be used in a number of potential applications. For example, this functionality may be useful in free space optical (FSO) communication systems, such as those involving satellites, aircraft, and other systems that can communicate via free space. This functionality may be useful in protecting communications over high-speed optical fibers, such as in telecommunication networks and commercial networks. This functionality may even be useful in applications that do not require communication capabilities. For instance, because of their ability to work over wide spectral bands simultaneously, the optical scrambling/descrambling devices 112 and 114 may be used to probe for spectral dispersion or fading, allowing for the balancing of optical channel allocations (as well as for esoteric applications, such as when used as the basis for a two-color Green's function approach to resolving satellite orbital positions through relativistic corrections to time of flight). In general, this disclosure is not limited to any particular application of the optical scrambling/descrambling devices 112 and 114.

Although FIGS. 2 and 3 illustrate examples of components of optical scrambling/descrambling devices 112 and 114 in an optical information scrambling system 100, various changes may be made to FIGS. 2 and 3. For example, various components in FIGS. 2 and 3 may be combined, further subdivided, replicated, omitted, or rearranged and additional components may be added according to particular needs.

FIGS. 4A through 4D illustrate an example PIC-based approach to support optical scrambling/descrambling in an optical information scrambling system according to this disclosure. More specifically, FIGS. 4A through 4D illustrate how photonic integrated circuits may be used to implement at least portions of the first manifold 208, signal modification block 210, and second manifold 212 in the OSD photonic integrated circuits 116.

Figure 4A:
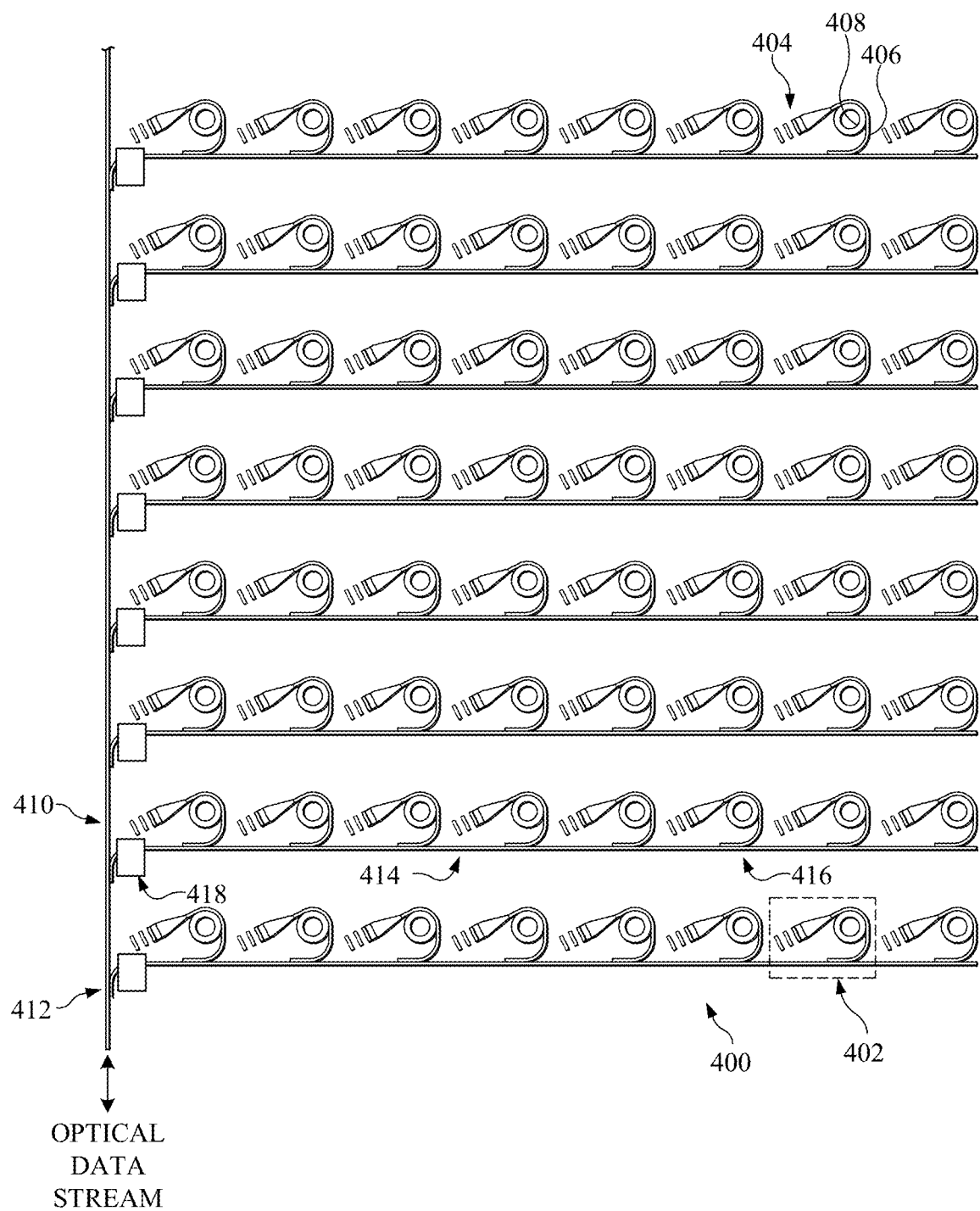
FIGS. 4A through 4D illustrate an example photonic integrated circuit (PIC)-based approach to support optical scrambling/descrambling in an optical information scrambling system according to this disclosure.

As shown in FIG. 4A, a photonic integrated circuit 400 includes a number of unit cells 402. In this example, the photonic integrated circuit 400 includes an 8×8 arrangement of unit cells 402, although other numbers and arrangements of unit cells 402 may be used here. Each unit cell 402 is configured to transmit or receive one or more optical signals. Each unit cell 402 includes an antenna element 404, which is configured to physically transmit or receive one or more optical signals to or from one or more external devices or systems. For example, each antenna element 404 may represent a nanophotonic antenna or other antenna element that transmits or receives at least one optical signal, along with one or more lenses or other optical devices configured to focus or otherwise process the at least one optical signal. Depending on the implementation, the antenna element 404 may sometimes be referred to as an emitter in a transmitting array or a receiver in a receiving array. Each antenna element 404 may have any suitable size, shape, and dimensions. In some cases, the emitting/receiving surface of the antenna element 404 may be about 3 μm to about 4 μm in diameter.

Each antenna element 404 here is coupled to a signal pathway 406. The signal pathways 406 are configured to transport optical signals to or from the antenna elements 404. For example, the signal pathways 406 can provide optical signals to the antenna elements 404 for transmission. Also or alternatively, the signal pathways 406 can transport optical signals received by the antenna elements 404. Each signal pathway 406 includes any suitable structure configured to transport optical signals, such as an optical waveguide.

Phase modulators 408 are provided in the unit cells 402 for the antenna elements 404 and are used (among other things) to control the phases of optical signals transmitted or received by the associated antenna elements 404. For example, when the antenna elements 404 are transmitting, the phase modulators 408 can be used to adjust the phases of the outgoing optical signals in order to support functions such as scrambling. When the antenna elements 404 are receiving, the phase modulators 408 can be used to adjust the phases of the incoming optical signals in order to support functions such as descrambling. Each phase modulator 408 includes any suitable structure configured to modulate the phase of one or more optical signals, such as a resonant micro-ring modulator or a PN junction micro-ring modulator. In some cases, each phase modulator 408 may be a resonant micro-ring modulator that is about 5.5 μm in diameter, although modulators of other sizes may be used here. The phase adjustments provided by the phase modulators 408 can be based on the private SD key currently being used by the optical scrambling/descrambling device 112 or 114.

As can be seen in FIG. 4A, the photonic integrated circuit 400 also includes a primary waveguide 410, which is used to transport the outgoing optical signals to the unit cells 402 or to transport the incoming optical signals from the unit cells 402. Splitters/combiners 412 are positioned along the primary waveguide 410 and configured to split the outgoing optical signals being transported over the primary waveguide 410 or to combine the incoming optical signals from the unit cells 402 for transport over the primary waveguide 410. Branch waveguides 414 optically couple the primary waveguide 410 to groups of unit cells 402. In this example, each of eight branch waveguides 414 optically couples the primary waveguide 410 to eight unit cells 402, although other numbers of branch waveguides 414 and unit cells 402 coupled to the branch waveguides 414 may be used. Additional splitters/combiners 416 are positioned along the branch waveguides 414 and configured to split the outgoing optical signals being transported over the branch waveguides 414 or to combine the incoming optical signals from the unit cells 402.

In this example, one or more signal modifiers 418 may be positioned along each of the branch waveguides 414 and used to modify the optical signals being transported over the branch waveguide 414. Note, however, that signal modifiers 418 may be positioned in other or additional locations, such as when other or additional signal modifiers 418 are positioned along the primary waveguide 410 (like between the branch waveguides 414). The signal modifiers 418 may represent any suitable structures configured to modify one or more characteristics of optical signals. In some embodiments, the signal modifiers 418 may include amplitude modulators, delay elements, or a combination thereof. The amplitude modulators may be used to alter the amplitudes of optical signals being transported through the photonic integrated circuit 400, such as via variable attenuation. The delay elements may be used to delay the optical signals being transported through the photonic integrated circuit 400. The amplitude adjustments provided by the amplitude modulators and/or the delays provided by the delay elements can be based on the private SD key currently being used by the optical scrambling/descrambling device 112 or 114. In some cases, the delays provided by the delay elements may increase monotonically along the primary waveguide 410. As a particular example, the bottom signal modifier 418 may provide a delay of about 2 picoseconds, the next signal modifier 418 may provide a delay of about 4 picoseconds, the next signal modifier 418 may provide a delay of about 6 picoseconds, and so on.

Figure 4B:
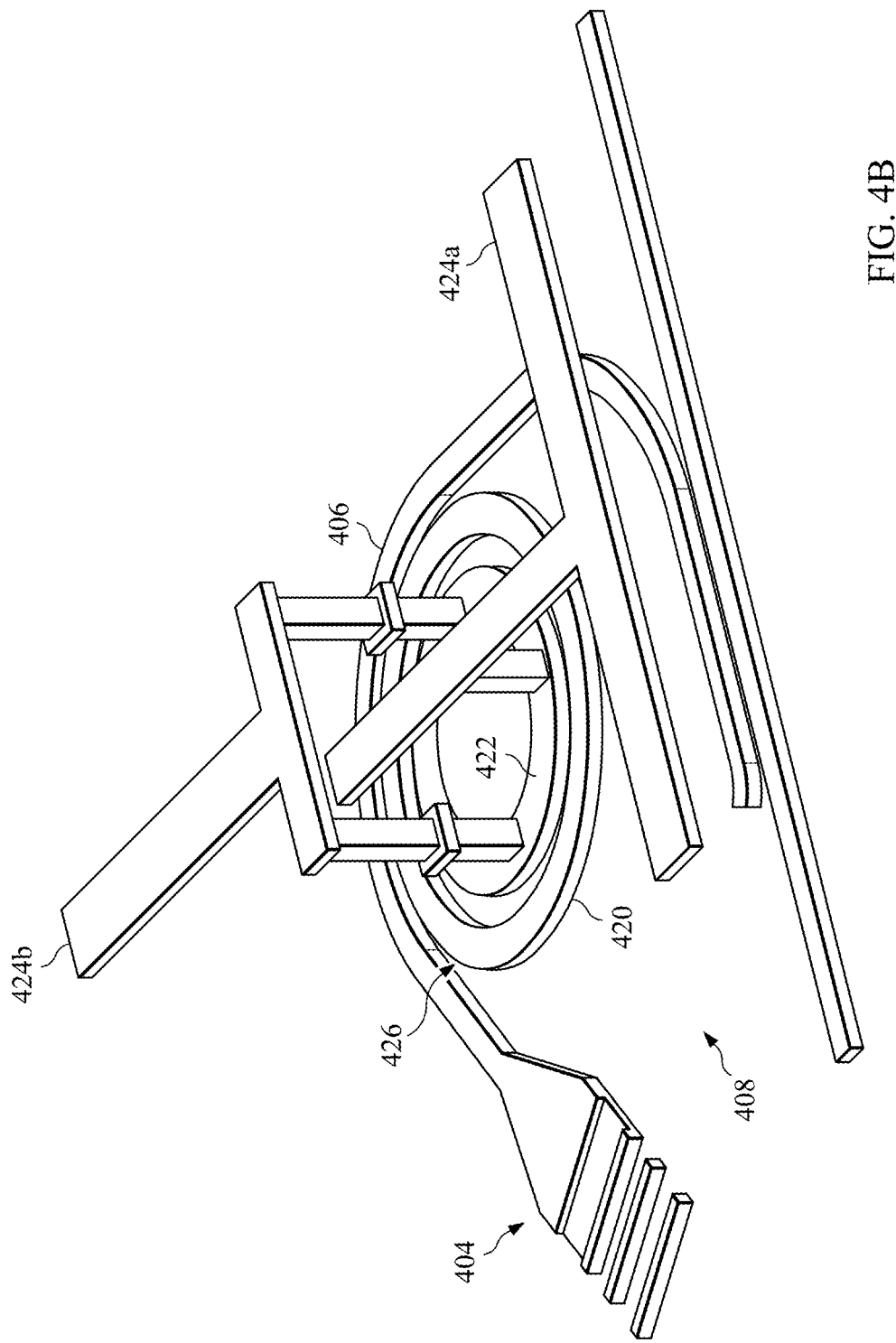
Figure 4C:
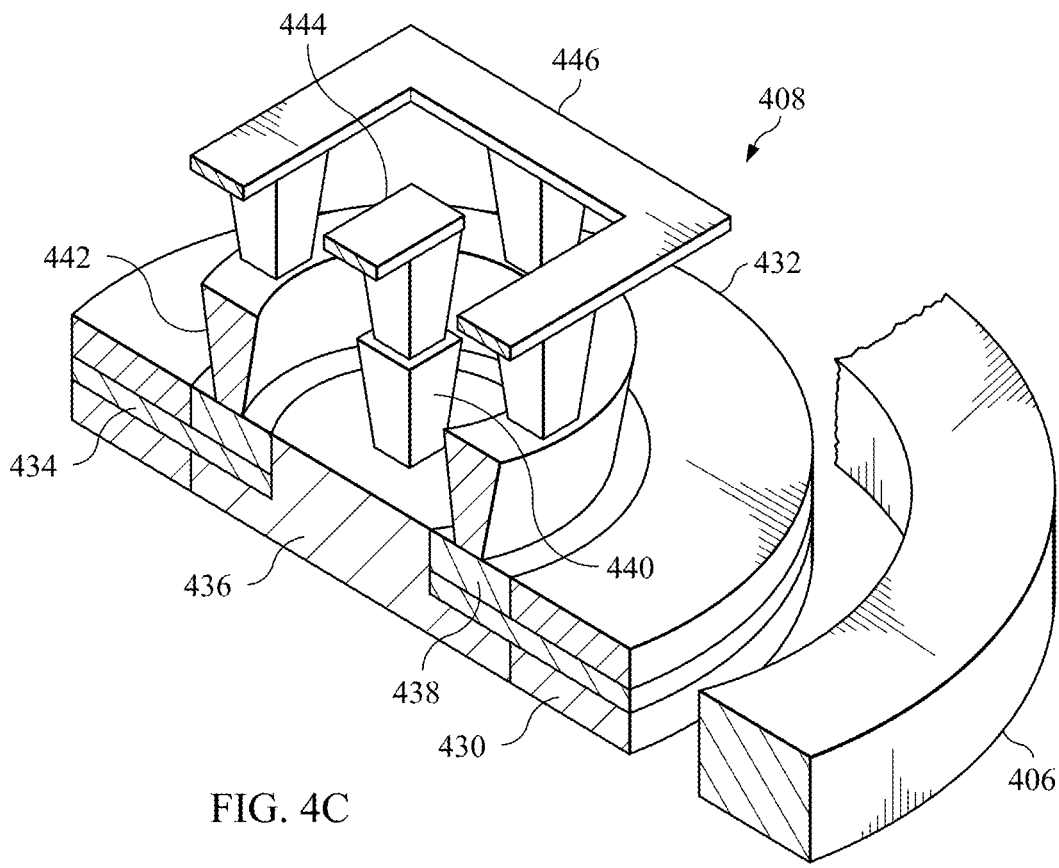

FIGS. 4B and 4C illustrate example phase modulators 408 that may be used in the photonic integrated circuit 400. As shown in FIG. 4B, the phase modulator 408 here represents a thermal resonator that is implemented using a micro-ring resonator 420 and a heater 422 positioned within or otherwise near the micro-ring resonator 420. The micro-ring resonator 420 resonates based on an optical signal flowing through an associated signal pathway 406. Varying the temperature of the micro-ring resonator 420 alters the resonance wavelength of the micro-ring resonator 420, thereby changing the phase of the optical signal flowing through the signal pathway 406. Voltages can be applied to the heater 422 via two electrical contacts 424a-424b in order to create the desired temperature change and therefore implement the desired phase shift of the optical signal flowing through the signal pathway 406. When the phase modulator 408 is used in a unit cell 402, different voltages applied to the heater 422 can cause different phase shifts to occur in the phase modulator 408.

The micro-ring resonator 420 may be formed from any suitable material(s), such as silicon, and in any suitable manner. The heater 422 may be formed from any suitable material(s), such as one or more metals or doped silicon, and in any suitable manner. The micro-ring resonator 420 may be separated from the heater 422 by any suitable material(s), such as silicon dioxide. The micro-ring resonator 420 and heater 422 may each have any suitable size, shape, and dimensions. In some embodiments, the micro-ring resonator 420 is annular and has a diameter of about 5.5 µm, and the heater 422 is circular and fits within the micro-ring resonator 420. However, other shapes and sizes may be used here. A gap 426 between the micro-ring resonator 420 and the signal pathway 406 may have any suitable value, such as about 150 nm to about 210 nm (±10 nm). In some cases, design parameters like the thickness of the micro-ring resonator 420 or the size of the gap 426 can be altered in order to provide desired functionality for the phase modulator 408.

As shown in FIG. 4C, the phase modulator 408 here represents a PN junction micro-ring modulator that is implemented using various regions of semiconductor material, such as doped and undoped silicon. In this example, the phase modulator 408 is shown in cross-section for explanation. Here, the phase modulator 408 includes a first annular semiconductor region 430 separated from a second annular semiconductor region 432. The annular semiconductor regions 430 and 432 can represent different types of semiconductor material, such as when the annular semiconductor region 430 represents an N-type semiconductor material and the annular semiconductor region 432 represents a P-type semiconductor material. A semiconductor region 434 (such as undoped silicon) can separate the regions 430-432. A doped semiconductor region 436 is positioned within the annular regions 430-432, and a doped semiconductor region 438 is positioned around an upper portion of the doped semiconductor region 436. The doped semiconductor regions 436 and 438 can represent different regions of semiconductor material with different dopants, such as when the doped semiconductor region 436 is doped with an N+ dopant and the doped semiconductor region 438 is doped with a P+ dopant. An electrical contact 440 can be used to form an electrical connection with the doped semiconductor region 436, and an electrical contact 442 can be used to form an electrical connection with the doped semiconductor region 438. An electrical connection 444 can be used to provide a voltage to the electrical contact 440, and an electrical connection 446 can be used to provide a voltage to the electrical contact 442.

Here, the various semiconductor regions 430-438 form a PN junction micro-ring modulator, and the electrical contacts 440 and 442 and electrical connections 444 and 446 allow voltages to be applied that alter the charge carrier density of the PN junction micro-ring modulator. This alters the phase of an optical signal flowing through the associated signal pathway 406. When the phase modulator 408 is used in a unit cell 402, different voltages applied to the electrical connections 444 and 446 can cause different phase shifts to occur in the phase modulator 408.

Figure 4D:
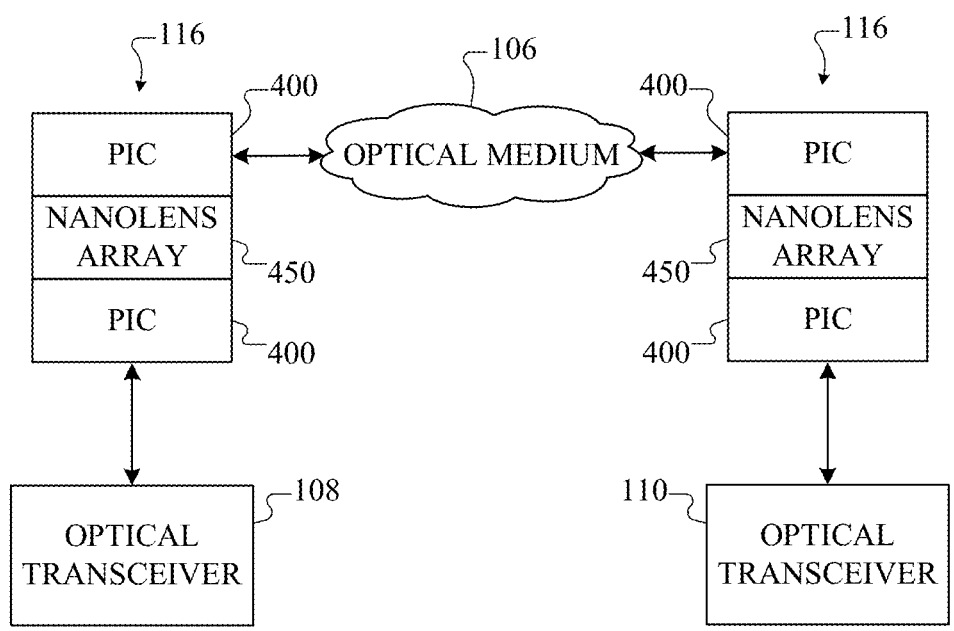

FIG. 4D illustrates how multiple instances of the photonic integrated circuit 400 may be used in the OSD photonic integrated circuits 116 of the optical scrambling/descrambling devices 112 and 114. As shown in FIG. 4D, in the case of optical transmissions from the optical transceiver 108 to the optical transceiver 110, an optical data stream from the optical transceiver 108 is provided to the associated OSD photonic integrated circuit 116 on the left. A bottom photonic integrated circuit 400 separates the optical data stream into separate optical channels and may perform amplitude modulations, phase modulations, delays, or other modifications to the optical signals in the optical channels. The bottom photonic integrated circuit 400 can therefore implement the first manifold 208 and optionally at least a portion of the signal modification block 210. A simple lens or microlens array 450 (where the array includes an array of very small lenses) can focus optical signals transmitted from the antenna elements 404 of the bottom photonic integrated circuit 400 into a top photonic integrated circuit 400. The top photonic integrated circuit 400 may perform amplitude modulations, phase modulations, delays, or other modifications to the optical signals in the optical channels and combine the modified optical signals into one or more scrambled combined signals for transmission over the optical medium 106. The top photonic integrated circuit 400 can therefore implement the second manifold 212 and optionally at least a portion of the signal modification block 210. Note that a single instance of the photonic integrated circuit 400 or both instances of the photonic integrated circuit 400 in the OSD photonic integrated circuit 116 may provide the modifications to the optical signals in the optical channels and thereby implement the signal modification block 210.

The one or more scrambled combined signals can be transported over the optical medium 106 to the OSD photonic integrated circuit 116 on the right. A top photonic integrated circuit 400 separates the one or more scrambled combined signals into separate optical channels and may perform amplitude modulations, phase modulations, delays, or other modifications to the optical signals in the optical channels to facilitate descrambling. The top photonic integrated circuit 400 can therefore implement the second manifold 212 and optionally at least a portion of the signal modification block 210. Another simple lens or microlens array 450 can focus optical signals transmitted from the antenna elements 404 of the top photonic integrated circuit 400 into a bottom photonic integrated circuit 400. The bottom photonic integrated circuit 400 may perform amplitude modulations, phase modulations, delays, or other modifications to the optical signals in the optical channels to facilitate descrambling and combine the descrambled optical signals into a recovered optical data stream for transmission to the optical transceiver 110. The bottom photonic integrated circuit 400 can therefore implement the first manifold 208 and optionally at least a portion of the signal modification block 210. Again, note that a single instance of the photonic integrated circuit 400 or both instances of the photonic integrated circuit 400 in the OSD photonic integrated circuit 116 may provide the modifications to the optical signals in the optical channels and thereby implement the signal modification block 210. Communications from the optical transceiver 110 to the optical transceiver 108 may occur in the same or similar manner using the OSD photonic integrated circuits 116.

Note that in this particular implementation, each OSD photonic integrated circuit 116 includes a pair of photonic integrated circuits 400, where optical signals are transmitted between the photonic integrated circuits 400 via the antenna elements 404. However, this is for illustration only. The photonic integrated circuits 400 shown in FIGS. 4A through 4C have been shown to be effective in permitting amplitude, phase, delay, and other modifications to be performed to optical signals transmitted from or received by the photonic integrated circuits 400. Thus, the photonic integrated circuits 400 shown in FIGS. 4A through 4C and the arrangement shown in FIG. 4D can be effective in terms of analyzing how amplitude modulators, phase modulators, delay elements, or other components may be implemented in order to see whether suitable modifications can be made in order to scramble and descramble optical signals.

Having said that, an actual implementation of each optical scrambling/descrambling device 112 and 114 meant for actual deployment may not need to use antenna elements 404 to transmit optical signals through microlens arrays between photonic integrated circuits 400. Instead, the optical scrambling/descrambling devices 112 and 114 may use waveguides that optically couple different signal pathways 406 in the photonic integrated circuits 400 while omitting the antenna elements 404 completely. In those cases, the simple lens or microlens arrays 450 may also be omitted since there is no need to focus optical signals transmitted by antenna elements 404 from one photonic integrated circuit 400 to another photonic integrated circuit 400. Moreover, a single photonic integrated circuit may have a layout and arrangement of components and pathways that include both manifolds and the signal modifying components in a planar PIC device.

Also note that while amplitude modulations, phase modulations, and delays are often described above as being implemented using the photonic integrated circuits 400, a number of other or additional modulations or other modifications may be made to optical signals in optical channels. Other example modifications may include the use of polarization changes, sub-array time delays, and selectively recombination of certain optical signals in certain optical channels. Any or all of the described signal modifications or other or additional signal modifications may be used, and the ways in which these signal modifications are performed can be based on the selected private SD key used by the OSD photonic integrated circuits 116.

Although FIGS. 4A through 4D illustrate one example of a PIC-based approach to support optical scrambling/descrambling in an optical information scrambling system 100, various changes may be made to FIGS. 4A through 4D. For example, the photonic integrated circuit 400 may include any suitable number of unit cells 402 in any suitable arrangement. In this particular example, the unit cells 402 are arranged in a Manhattan layout, and the phase modulators 408 and signal modifiers 418 are positioned within the unit cells 402 or close to the unit cells 402. However, the unit cells 402 may have any other suitable arrangement, and the phase modulators 408 and signal modifiers 418 may be positioned in any suitable locations (possibly even relatively remote from the unit cells 402). Also, the actual structure of a thermal resonator or PN junction micro-ring modulator can vary as needed or desired, and any other suitable structure may be used to modulate an optical signal in the photonic integrated circuit 400. Further, the use of thermal resonators or PN junction micro-ring modulators are optional, and other approaches may be used to modulate optical signals. For instance, Mach Zehnder modulators and optical attenuators may be used in different optical channels in order to modulate the optical signals in those optical channels. In addition, the physical layout of the photonic integrated circuit 400 may vary as needed or desired.

Figure 5:
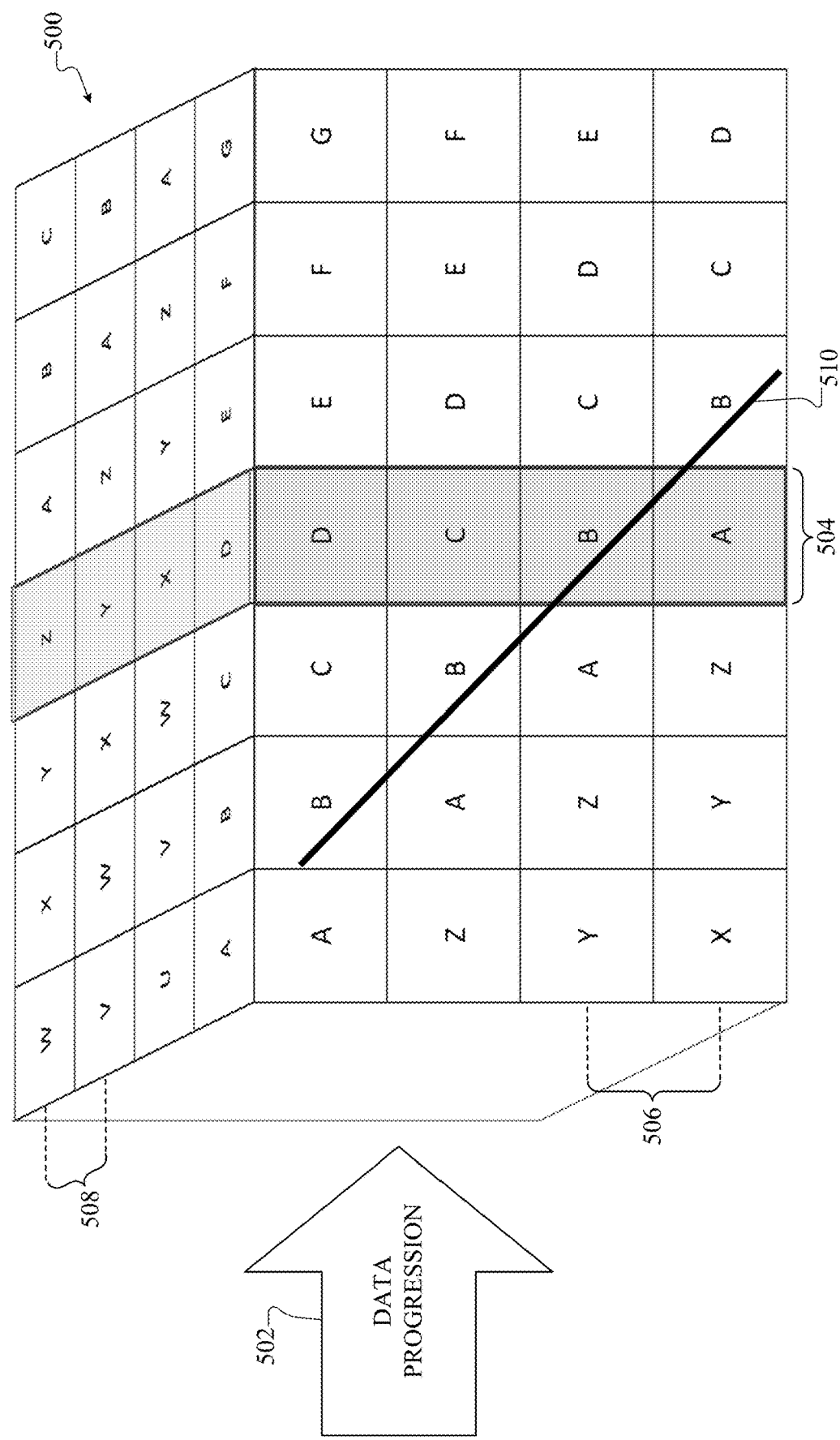
FIG. 5 illustrates an example graphical representation of time-sliced optical fogging to support optical scrambling/descrambling in an optical information scrambling system according to this disclosure.

FIG. 5 illustrates an example graphical representation 500 of time-sliced optical fogging to support optical scrambling/descrambling in an optical information scrambling system 100 according to this disclosure. For ease of explanation, FIG. 5 is described as illustrating one possible mode of operation in the optical scrambling/descrambling devices 112 and 114 within the optical information scrambling system 100 of FIG. 1. However, these components may operate in any other suitable manner.

As shown in FIG. 5, an input optical data stream 502 is received over time, and various cubelets are used to represent optical signals in different time slices 504. One specific time slice 504 is shaded in FIG. 5 for easy identification. In some embodiments, each time slice 504 of the graphical representation 500 can span a single clock cycle, such as a 20 picosecond time period. Each time slice 504 is a two-dimensional (2D) representation of the optical signals transmitted by at least one photonic integrated circuit based on the input optical data stream 502.

Delays 506 between cubelets up-and-down in FIG. 5 represent the time delays associated with different rows of unit cells 402 in FIG. 4A, such as when the delays 506 equal about 2 picoseconds each. This is consistent with the use of delay elements in the signal modifiers 418, which as noted above can provide delays of about 2 picoseconds, about 4 picoseconds, about 6 picoseconds, and so on (possibly in combination with the delays associated with traversal of optical signals along different lengths of the primary waveguide 410). Delays 508 between cubelets front-to-back in FIG. 5 represent the time delays associated with different unit cells 402 in a single row in FIG. 4A, which may be associated with traversal of optical signals along different lengths of the associated branch waveguides 414 to reach different unit cells 402. Here, the delay between each adjacent pair of unit cells 402 in the given row may be about 0.2 picoseconds, so there may be a delay of about 0.2 picoseconds to reach the first unit cell 402 in the row, a delay of about 0.4 picoseconds to reach the second unit cell 402 in the row, a delay of about 0.6 picoseconds to reach the third unit cell 402 in the row, and so on. Note that the number of time slices 504 left-to-right, the number of cubelets up-and-down, and the number of cubelets front-to-back can easily vary from those shown here.

The letters in the cubelets of FIG. 5 represent different optical states, such as different amplitude and phase modulations applied to transmitted optical signals by the at least one photonic integrated circuit. A line 510 illustrates how the same optical state can be used by different unit cells 402 in consecutive time slices 504. It is possible to exploit the potential parallelism from technologies such as dense wavelength division multiplexing (DWDM) and quadrature amplitude modulation (QAM) to achieve extremely large effective bit rates using this type of approach. In some embodiments, for example, the effective bit rate that can be achieved through the OSD photonic integrated circuits 116 may be up to 3 Tb/sec at a 50 GHz clock cycle. However, the data rate and clock cycle values are examples only and can vary as needed or desired.

Although FIG. 5 illustrates one example of a graphical representation 500 of time-sliced optical fogging to support optical scrambling/descrambling in an optical information scrambling system 100, various changes may be made to FIG. 5. For example, the graphical representation 500 represents one example way in which fogging (scrambling) may occur in the OSD photonic integrated circuits 116. However, any other suitable signal modifications may be used to support optical fogging.

Figure 6:
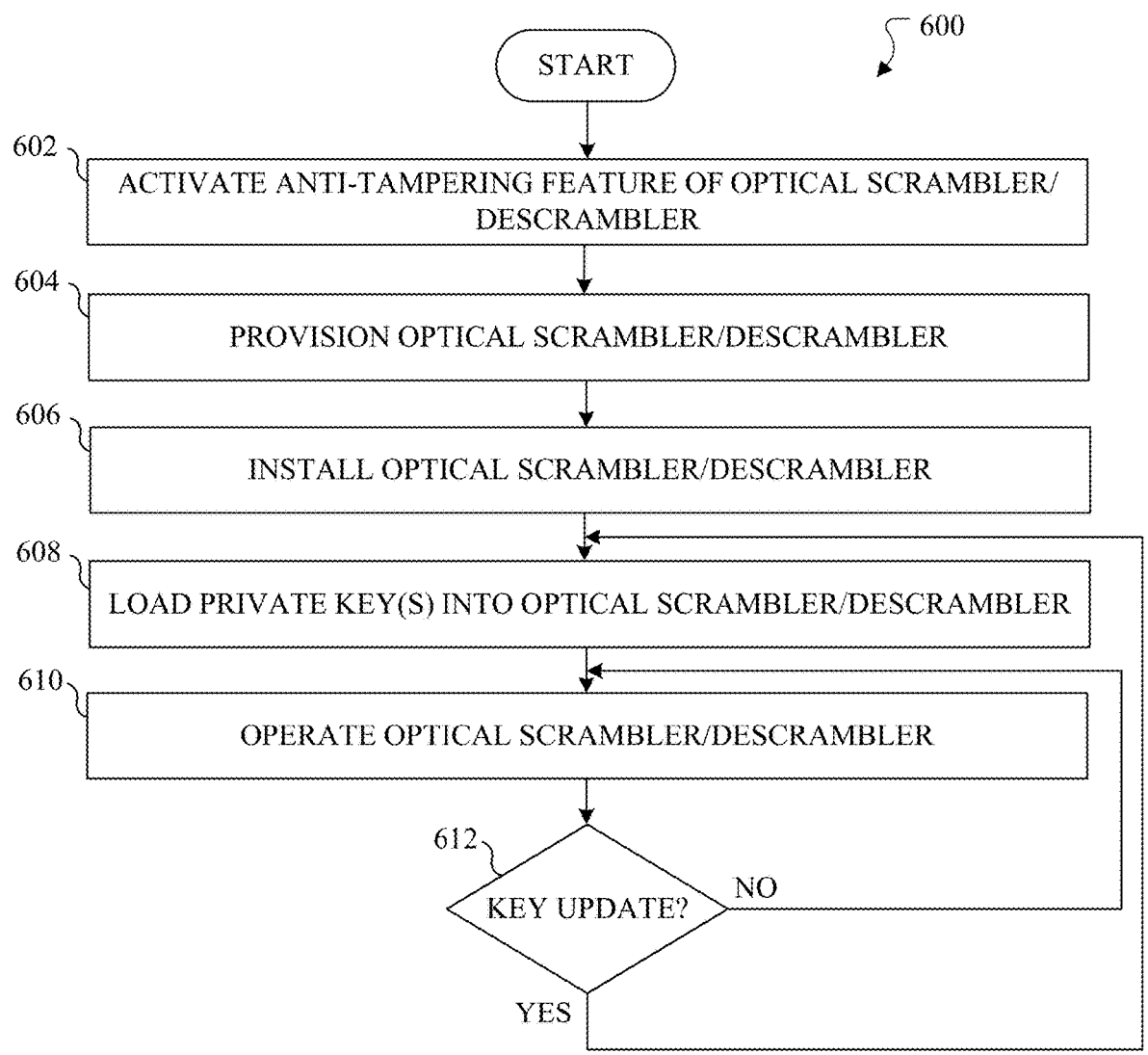
FIG. 6 illustrates an example method for configuring and using an optical scrambling/descrambling device in an optical information scrambling system according to this disclosure.

FIG. 6 illustrates an example method 600 for configuring and using an optical scrambling/descrambling device in an optical information scrambling system according to this disclosure. For ease of explanation, the method 600 of FIG. 6 is described as being performed using the optical scrambling/descrambling devices 112 and 114 within the optical information scrambling system 100 of FIG. 1. However, the method 600 may be performed using any other suitable devices and in any other suitable systems.

As shown in FIG. 6, during manufacturing of an optical scrambling/descrambling device, an anti-tampering feature of the optical scrambling/descrambling device is activated at step 602. This may include, for example, activating the anti-tamper mechanism 310 so that attempts to probe or otherwise illicitly access SD keys or other information in the optical scrambling/descrambling device 112 or 114 can trigger clearing of the SD keys or other data from memory or other suitable protective actions. In some cases, following an anti-tamper event, the device needs to be re-provisioned or simply reloaded with the private SD key(s).

The optical scrambling/descrambling device is provisioned at step 604. This may include, for example, loading initial software and key material into one of the optical scrambling/descrambling devices 112 or 114. This information can be obtained directly from the key authority 120 or from any other suitable source(s) or indirectly, such as via one or more network connections. The loaded initial software and key material can include one or more trust anchors, one or more bootloader keys, bootloader software, key management software, and control software. As a particular example, seed key material may be obtained in the form of one or more trust anchors, one or more bootloader keys, cryptographic software and firmware, and initial key data. In some embodiments, this step can be performed by a manufacturer or other party prior to delivery of the optical scrambling/descrambling device 112 or 114 to a customer (an actual user of the optical scrambling/descrambling device 112 or 114). Software/firmware, SD keys, or other information can be loaded onto the optical scrambling/descrambling device 112 or 114 securely, such as by using decryption and digital signature verification. In most cases, quantum-resistant algorithms can be used if needed or desired. For any of this information, the root of trust 312 can decrypt and verify digital signatures of received software, configuration data, and SD keys The optical scrambling/descrambling device is installed at step 606. This may include, for example, personnel installing the optical scrambling/descrambling device 112 or 114 in the form of a standalone device, an SFP module, an embeddable circuit, a photonic ASIC, or other suitable device. As a particular example, the optical scrambling/descrambling device 112 or 114 may be provided to a customer for installation in an optical terminal or other optical node in the customer's optical system. One or more private SD keys are loaded onto the optical scrambling/descambling device at step 608. This may include, for example, loading the customer's own private SD key(s) into the optical scrambling/descrambling device 112 or 114 via the OSD manager 118.

The optical scrambling/descrambling device is placed into operation and used at step 610. This may include, for example, the optical scrambling/descrambling device 112 or 114 operating to scramble optical signals for communication over the optical medium 106 and/or descramble optical signals received over the optical medium 106. The scrambling/descrambling operations can be performed based on the current SD key(s) being used by the optical scrambling/descrambling device 112 or 114. During this time, operational parameters may be monitored, such as from a dashboard at a management workstation of the network operator 122. This can continue until a key update occurs at step 612. At that point, the process can return to step 608 in order to load one or more new private SD keys. In this way, the network operator 122 can monitor the status of the optical scrambling/descrambling device 112 or 114, reconfigure the optical scrambling/descrambling device 112 or 114 with new encrypted key material (such as from an external connection to the key authority 120), monitor operations of the optical scrambling/descrambling device 112 or 114 for performance or tampering events, and command the optical scrambling/descrambling device 112 or 114 to clear keys, disable operations, or perform other functions.

Although FIG. 6 illustrates one example of a method 600 for configuring and using an optical scrambling/descrambling device 112 or 114 in an optical information scrambling system 100, various changes may be made to FIG. 6. For example, while shown as a series of steps, various steps in FIG. 6 may overlap, occur in parallel, occur in a different order, or occur any number of times. Also, the same process shown here may be used for each optical scrambling/descrambling device 112 and 114 in the optical information scrambling system 100.

Figure 7:
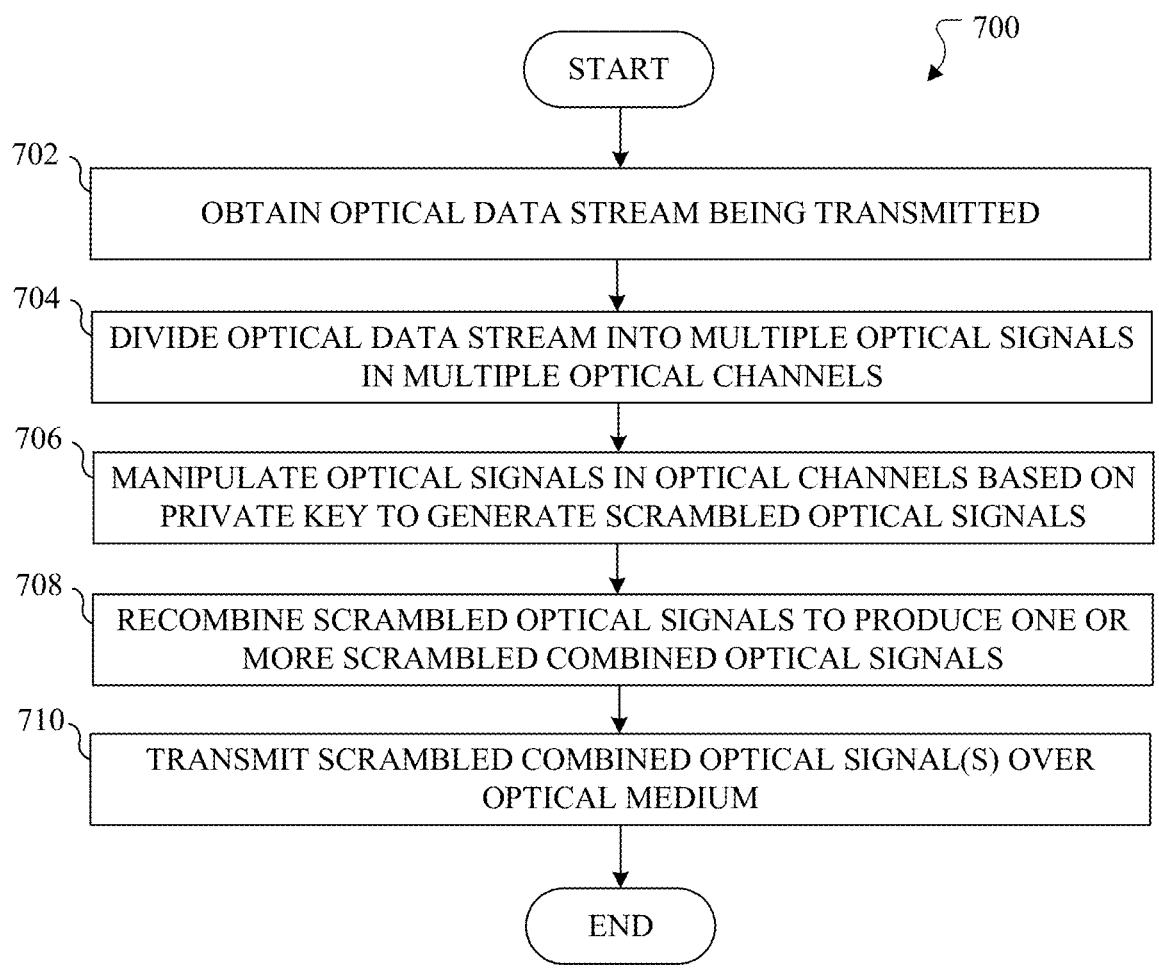
FIG. 7 illustrates an example method for optical scrambling in an optical information scrambling system according to this disclosure.

FIG. 7 illustrates an example method 700 for optical scrambling in an optical information scrambling system according to this disclosure. For ease of explanation, the method 700 of FIG. 7 is described as being performed using the optical scrambling/descrambling devices 112 and 114 within the optical information scrambling system 100 of FIG. 1. However, the method 700 may be performed using any other suitable devices and in any other suitable systems.

As shown in FIG. 7, an optical data stream being transmitted is obtained at step 702. This may include, for example, the data interface 202 of the OSD photonic integrated circuit 116 in an optical scrambling/descrambling device 112 or 114 obtaining an optical data stream 502 transmitted from an optical transmitter or transceiver. The optical data stream is split into multiple optical signals in multiple optical channels at step 704. This may include, for example, the first manifold 208 in the optical scrambling/descrambling device 112 or 114 splitting the optical data stream 502 into multiple distinct branches to form multiple optical signals in multiple optical channels. As a particular example, the first manifold 208 may include a primary waveguide 410 and branch waveguides 414, along with various combiners/splitters 412 and 416 that divide the optical data stream 502 into separate optical signals in the first manifold 208.

The optical signals in the optical channels are manipulated based on at least one private SD key to produce scrambled optical signals at step 706. This may include, for example, the signal modification block 210 in the optical scrambling/descrambling device 112 or 114 using phase modulators 408, signal modifiers 418, or other components to provide amplitude modulations, phase modulations, delays, coherent combinations, or any combinations thereof in different optical channels or different combinations of optical channels. Modifications to the optical signals in the different optical channels or different combinations of optical channels can occur sequentially, in parallel, or both. The private SD key can be used to define if (and to what extent) amplitude modulations, phase modulations, delays, coherent combinations, or other signal modifications are applied in the various optical channels. The result is a scrambling of the optical signals in the optical channels.

The scrambled optical signals are recombined to produce one or more scrambled combined optical signals at step 708. This may include, for example, the second manifold 212 in the optical scrambling/descrambling device 112 or 114 combining the scrambled optical signals from multiple distinct branches to form the one or more scrambled combined optical signals. As a particular example, the second manifold 212 may include a primary waveguide 410 and branch waveguides 414, along with various combiners/splitters 412 and 416 that combine the scrambled optical signals into the one or more scrambled combined optical signals. The one or more scrambled combined optical signals are transmitted over an optical medium at step 710. This may include, for example, transmitting the one or more scrambled combined optical signals over the optical medium 106 via the fog interface 204.

Although FIG. 7 illustrates one example of a method 700 for optical scrambling in an optical information scrambling system, various changes may be made to FIG. 7. For example, while shown as a series of steps, various steps in FIG. 7 may overlap, occur in parallel, occur in a different order, or occur any number of times. Also, the same process shown here may be used with each optical scrambling/descrambling device 112 and 114 that is used for scrambling outgoing optical communications in the optical information scrambling system 100.

Figure 8:
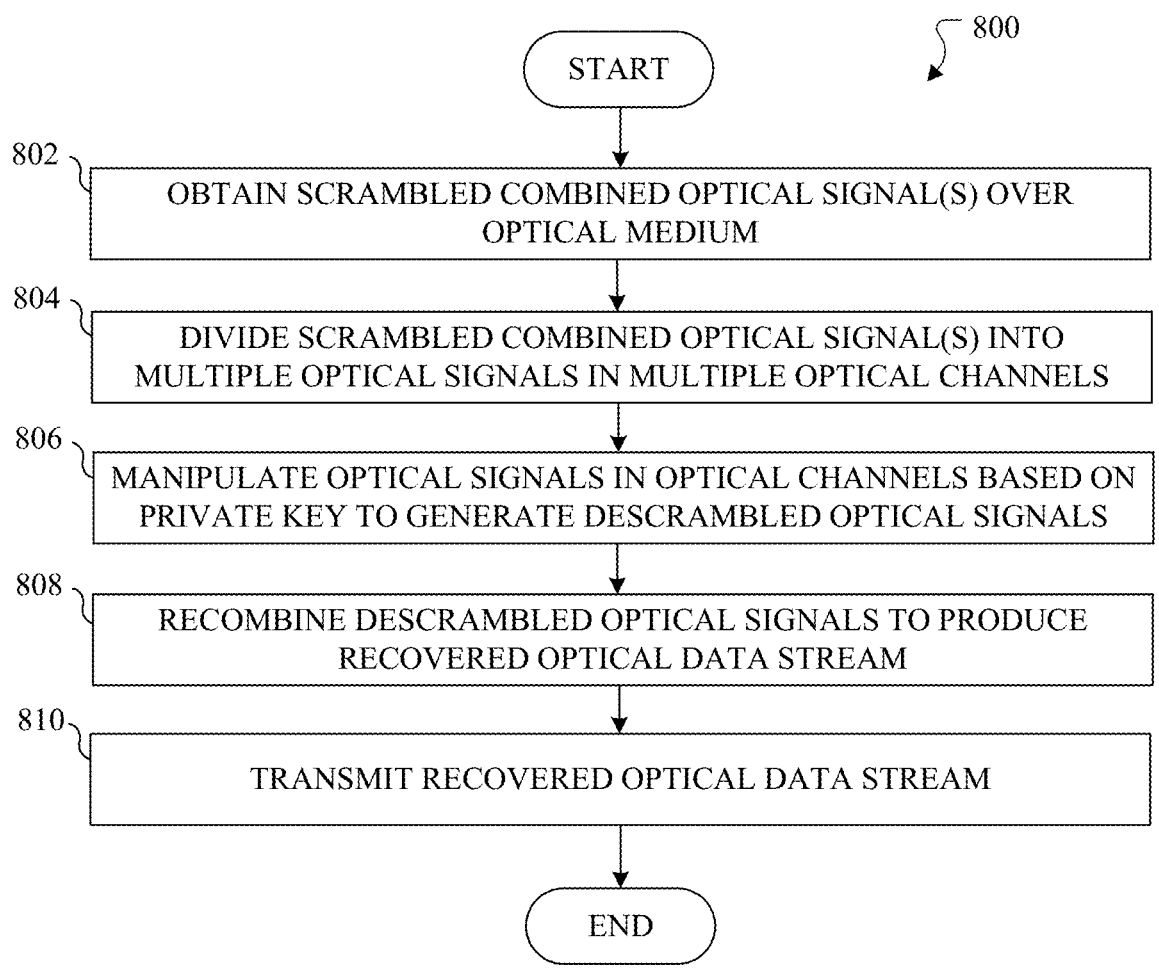
FIG. 8 illustrates an example method for optical descrambling in an optical information scrambling system according to this disclosure.

FIG. 8 illustrates an example method 800 for optical descrambling in an optical information scrambling system according to this disclosure. For ease of explanation, the method 800 of FIG. 8 is described as being performed using the optical scrambling/descrambling devices 112 and 114 within the optical information scrambling system 100 of FIG. 1. However, the method 800 may be performed using any other suitable devices and in any other suitable systems.

As shown in FIG. 8, one or more scrambled combined optical signals are obtained at step 802. This may include, for example, the fog interface 204 of the OSD photonic integrated circuit 116 in an optical scrambling/descrambling device 112 or 114 obtaining one or more scrambled combined optical signals over the optical medium 106. The one or more scrambled combined optical signals are split into multiple optical signals in multiple optical channels at step 804. This may include, for example, the second manifold 212 in the optical scrambling/descrambling device 112 or 114 splitting the one or more scrambled combined optical signals into multiple distinct branches to form multiple optical signals in multiple optical channels. As a particular example, the second manifold 212 may include a primary waveguide 410 and branch waveguides 414, along with various combiners/splitters 412 and 416 that divide the one or more scrambled combined optical signals into separate optical signals in the second manifold 212.

The optical signals in the optical channels are manipulated based on at least one private SD key to produce descrambled optical signals at step 806. This may include, for example, the signal modification block 210 in the optical scrambling/descrambling device 112 or 114 using phase modulators 408, signal modifiers 418, or other components to provide amplitude modulations, phase modulations, delays, coherent combinations, or any combinations thereof in different optical channels or different combinations of optical channels. Modifications to the optical signals in the different optical channels or different combinations of optical channels can occur sequentially, in parallel, or both. The private SD key can be used to define if (and to what extent) amplitude modulations, phase modulations, delays, coherent combinations, or other signal modifications are applied in the various optical channels. Ideally, the signal modifications applied here can substantially or completely reverse the scrambling of the optical signals performed by another optical scrambling/descrambling device 112 or 114. The result is a descrambling of the optical signals in the optical channels.

The descrambled optical signals are recombined to produce a recovered optical data stream at step 808. This may include, for example, the first manifold 208 in the optical scrambling/descrambling device 112 or 114 combining the descrambled optical signals from multiple distinct branches to form the recovered optical data stream. As a particular example, the first manifold 208 may include a primary waveguide 410 and branch waveguides 414, along with various combiners/splitters 412 and 416 that combine the descrambled optical signals into the recovered optical data stream. The recovered optical data stream is transmitted at step 810. This may include, for example, transmitting the recovered optical data stream to an optical receiver or transceiver via the data interface 202.

Although FIG. 8 illustrates one example of a method 800 for optical descrambling in an optical information scrambling system, various changes may be made to FIG. 8. For example, while shown as a series of steps, various steps in FIG. 8 may overlap, occur in parallel, occur in a different order, or occur any number of times. Also, the same process shown here may be used with each optical scrambling/descrambling device 112 and 114 that is used for descrambling outgoing optical communications in the optical information scrambling system 100.

It is often assumed above that the OSD photonic integrated circuits 116 scramble optical signals by performing signal modifications in different optical channels or combinations of optical channels and descramble the optical signals by reversing the signal modifications in different optical channels or combinations of optical channels, both of which are based on the use of a SD key. However, other approaches may be used to support the scrambling and descrambling of optical signals in optical channels using the OSD photonic integrated circuits 116. For example, instead of using a SD key to control the signal modifications in the different optical channels or combinations of optical channels, the optical signals can be further projected into an alternate space (such as by using Galois projection) through the application of optical signal processing. This may allow, for instance, Hadamard multiplication to occur optically using the OSD photonic integrated circuits 116. A hybrid approach can also be used, such as when signal modifications are performed using both a SD key and optical signal processing. In particular embodiments, the application of time-serial delays and techniques in conjunction with parallel manipulations of phases and amplitudes across or within spectral channels can allow various degrees of optical scrambling as needed or desired.

Moreover, it is often assumed above that the OSD photonic integrated circuits 116 are used in a bidirectional manner. In some cases, this may be achieved by using different portions of the OSD photonic integrated circuits 116 for transmission and reception of optical signals. An optical circulator may be used at or near the data interface 202 in order to support the simultaneous receipt of optical signals to be scrambled and transmission of optical signals that have been descrambled. In some cases (such as those cases implementing optical XOR operations), an SD code can be its own complement, and optical signals could bidirectionally share the same optical pathways. In other cases, separate OSD photonic integrated circuits 116 may be used in each optical scrambling/descrambling device 112 and 114 to support bidirectional communication.

In addition, the various systems, devices, and approaches have been described above as being used to facilitate the scrambling and descrambling of optical signals. However, similar systems, devices, and approaches may be used to facilitate the scrambling and descrambling of other electromagnetic signals, such as radio frequency (RF) signals. As a result, components such as optical waveguides and optical combiners/splitters as described above can be replaced with RF waveguides and RF combiners/splitters or other components used to transport and split/combine electromagnetic signals. Similarly, phase modulators, amplitude modulators, delay elements, coherent combiners, and other signal modifiers used to modify optical signals as described above can be replaced with corresponding signal modifiers for RF signals or other electromagnetic signals.

The following describes example embodiments of this disclosure that implement or relate to an optical information scrambling system and method. However, other embodiments may be used in accordance with the teachings of this disclosure.

In a first embodiment, a method includes receiving an outgoing data stream and dividing the outgoing data stream to generate multiple electromagnetic signals in multiple channels using a first manifold. The method also includes modifying at least some of the electromagnetic signals in at least some of the channels to generate scrambled electromagnetic signals. The method further includes combining the scrambled electromagnetic signals to generate one or more outgoing scrambled combined electromagnetic signals using a second manifold. In addition, the method includes transmitting the one or more outgoing scrambled combined electromagnetic signals.

Any single one or any suitable combination of the following features may be used with the first embodiment. The method may also include receiving one or more incoming scrambled combined electromagnetic signals, dividing the one or more incoming scrambled combined electromagnetic signals to generate multiple second electromagnetic signals in the multiple channels using the second manifold, modifying at least some of the second electromagnetic signals in at least some of the channels to generate descrambled electromagnetic signals, combining the descrambled electromagnetic signals to generate an incoming data stream using the first manifold, and transmitting the incoming data stream. Modifying at least some of the electromagnetic signals and modifying at least some of the second electromagnetic signals may each include performing signal modifications based on at least one private SD key. The outgoing data stream may include an outgoing optical data stream. A photonic integrated circuit may divide the outgoing optical data stream and produce scrambled optical signals. The photonic integrated circuit may be configured to handle outgoing optical data streams having at least one of: different protocols or different data rates. The photonic integrated circuit may be configurable to modify optical signals in each of the channels or in combinations of the channels independently of one another. The photonic integrated circuit may be positioned within an optical communication channel separate from a source of the outgoing optical data stream and a recipient of the scrambled optical signals. Modifying at least some of the electromagnetic signals in at least some of the channels may include performing different amplitude modulations, phase modulations, delays, coherent combinations, or any combinations thereof in different ones of the channels or in different combinations of the channels.

In a second embodiment, an apparatus includes a first interface configured to receive an outgoing data stream. The apparatus also includes a first manifold configured to divide the outgoing data stream and generate multiple electromagnetic signals in multiple channels. The apparatus further includes multiple signal modifiers configured to alter at least some of the electromagnetic signals in at least some of the channels and generate scrambled electromagnetic signals. The apparatus also includes a second manifold configured to combine the scrambled electromagnetic signals and generate one or more outgoing scrambled combined electromagnetic signals. In addition, the apparatus includes a second interface configured to transmit the one or more outgoing scrambled combined electromagnetic signals.

Any single one or any suitable combination of the following features may be used with the second embodiment. The second interface may be further configured to receive one or more incoming scrambled combined electromagnetic signals, the second manifold may be further configured to divide the one or more incoming scrambled combined electromagnetic signals and generate multiple second electromagnetic signals in the multiple channels, the signal modifiers may be further configured to modify at least some of the second electromagnetic signals in at least some of the channels and generate descrambled electromagnetic signals, the first manifold may be further configured to combine the descrambled electromagnetic signals and generate an incoming data stream, and the first interface may be further configured to transmit the incoming data stream. Modifications to at least some of the electromagnetic signals may be based on at least one private symmetric scrambling/descrambling key. The outgoing data stream may include an outgoing optical data stream. The apparatus may further include a photonic integrated circuit that includes the first interface, the first manifold, the signal modifiers, the second manifold, and the second interface. The photonic integrated circuit may be configured to divide the outgoing optical data stream and produce scrambled optical signals. The photonic integrated circuit may be configured to be optically positioned within an optical communication channel separate from a source of the outgoing optical data stream and a recipient of the scrambled optical signals. The photonic integrated circuit may be configured to handle outgoing optical data streams having at least one of: different protocols or different data rates. The photonic integrated circuit may be configurable to modify optical signals in each of the channels or in combinations of the channels independently of one another. The photonic integrated circuit may be configured to perform different amplitude modulations, phase modulations, delays, coherent combinations, or any combinations thereof in different ones of the channels or in different combinations of the channels. Each of the first and second manifolds may include a primary waveguide, multiple branch waveguides optically coupled to the primary waveguide, and multiple combiners/splitters positioned along the primary waveguide and the branch waveguides. The apparatus may further include a manager configured to control a configuration of the photonic integrated circuit based on one or more private symmetric scrambling/descrambling keys, where modifications to at least some optical signals by the photonic integrated circuit are based on the one or more private symmetric scrambling/descrambling keys. The photonic integrated circuit may be reconfigurable over time to support use of different private symmetric scrambling/descrambling keys at different times to scramble the optical signals.

In a third embodiment, an apparatus includes means for receiving an outgoing data stream. The apparatus also includes means for dividing the outgoing data stream to generate multiple electromagnetic signals in multiple channels. The apparatus further includes means for altering at least some of the electromagnetic signals in at least some of the channels to generate scrambled electromagnetic signals. The apparatus also includes means for combining the scrambled electromagnetic signals to generate one or more outgoing scrambled combined electromagnetic signals. In addition, the apparatus includes means for transmitting the one or more outgoing scrambled combined electromagnetic signals.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    at a first device:
        receiving an outgoing data stream;
        dividing the outgoing data stream to generate multiple first electromagnetic signals in multiple channels using a first manifold;
        modifying at least some of the first electromagnetic signals in at least some of the channels to generate scrambled electromagnetic signals;
        combining the scrambled electromagnetic signals to generate one or more outgoing scrambled combined electromagnetic signals using a second manifold; and
        transmitting, via a first fog interface of the first device, the one or more outgoing scrambled combined electromagnetic signals to a second fog interface of a second device;
        receiving, via the first fog interface of the first device, one or more incoming scrambled combined electromagnetic signals from the second device;
        dividing the one or more incoming scrambled combined electromagnetic signals to generate multiple second electromagnetic signals in the multiple channels using the second manifold;
        modifying at least some of the second electromagnetic signals in at least some of the channels to generate descrambled electromagnetic signals;
        combining the descrambled electromagnetic signals to generate an incoming data stream using the first manifold; and
        transmitting the incoming data stream to a receiver;
    wherein the outgoing data stream comprises an outgoing optical data stream;
    wherein a photonic integrated circuit divides the outgoing optical data stream and produces scrambled optical signals; and
    wherein the photonic integrated circuit comprises a micro-ring resonator configured to operate as a phase-based modulator/demodulator.

2. The method of claim 1, wherein modifying at least some of the first electromagnetic signals and modifying at least some of the second electromagnetic signals at the first device each comprises performing signal modifications based on at least one private symmetric scrambling/descrambling key maintained at the first device.

3. The method of claim 2, wherein the at least one private symmetric scrambling/descrambling key supports one time pad encryption.

4. The method of claim 1, wherein the photonic integrated circuit is configured to handle different outgoing optical data streams having at least one of: different protocols or different data rates.

5. The method of claim 1, wherein the photonic integrated circuit is configurable to modify optical signals in each of the channels or in combinations of the channels independently of one another.

6. The method of claim 1, wherein the photonic integrated circuit is positioned within an optical communication channel separate from a source of the outgoing optical data stream and a recipient of the scrambled optical signals.

7. The method of claim 1, wherein the one or more outgoing scrambled combined electromagnetic signals are transmitted to the second fog interface via free space.

8. An apparatus comprising:
a first interface configured to receive an outgoing data stream;
a first manifold configured to divide the outgoing data stream and generate multiple first electromagnetic signals in multiple channels;
multiple signal modifiers configured to alter at least some of the first electromagnetic signals in at least some of the channels and generate scrambled electromagnetic signals;
a second manifold configured to combine the scrambled electromagnetic signals and generate one or more outgoing scrambled combined electromagnetic signals; and
a second interface configured to transmit the one or more outgoing scrambled combined electromagnetic signals, wherein the second interface comprises a first fog interface configured to transmit the outgoing scrambled combined electromagnetic signals to a second fog interface of a second apparatus;
wherein the second interface is further configured to receive one or more incoming scrambled combined electromagnetic signals from the second apparatus;
wherein the second manifold is further configured to divide the one or more incoming scrambled combined electromagnetic signals and generate multiple second electromagnetic signals in the multiple channels;
wherein the signal modifiers are further configured to modify at least some of the second electromagnetic signals in at least some of the channels and generate descrambled electromagnetic signals;
wherein the first manifold is further configured to combine the descrambled electromagnetic signals and generate an incoming data stream;
wherein the first interface is further configured to transmit the incoming data stream;
wherein the outgoing data stream comprises an outgoing optical data stream; and
wherein the apparatus comprises a photonic integrated circuit that includes the first interface, the first manifold, the signal modifiers, the second manifold, and the second interface, the photonic integrated circuit configured to divide the outgoing optical data stream and produce scrambled optical signals, the photonic integrated circuit comprising a micro-ring resonator configured to operate as a phase-based modulator/demodulator.

9. The apparatus of claim 8, wherein modifications to at least some of the electromagnetic signals are based on at least one private symmetric scrambling/descrambling key maintained at the apparatus.

10. The apparatus of claim 8, further comprising:
a manager configured to control a configuration of the photonic integrated circuit based on one or more private symmetric scrambling/descrambling keys, modifications to at least some optical signals by the photonic integrated circuit based on the one or more private symmetric scrambling/descrambling keys.

11. The apparatus of claim 10, wherein the photonic integrated circuit is reconfigurable over time to support use of different private symmetric scrambling/descrambling keys at different times.

12. The apparatus of claim 9, wherein the at least one private symmetric scrambling/descrambling key supports one time pad encryption.

13. The apparatus of claim 8, wherein the photonic integrated circuit is configured to be optically positioned within an optical communication channel separate from a source of the outgoing optical data stream and a recipient of the scrambled optical signals.

14. The apparatus of claim 8, wherein the photonic integrated circuit is configured to handle different outgoing optical data streams having at least one of: different protocols or different data rates.

15. The apparatus of claim 8, wherein the photonic integrated circuit is configurable to modify optical signals in each of the channels or in combinations of the channels independently of one another.

16. The apparatus of claim 8, wherein the photonic integrated circuit is configured to perform different amplitude modulations, phase modulations, delays, coherent combinations, or any combinations thereof in different ones of the channels or in different combinations of the channels.

17. The apparatus of claim 8, wherein each of the first and second manifolds comprises:
a primary waveguide;
multiple branch waveguides optically coupled to the primary waveguide; and
multiple combiners/splitters positioned along the primary waveguide and the branch waveguides.

18. The apparatus of claim 8, wherein the second interface is configured to transmit the outgoing scrambled combined electromagnetic signals to the second fog interface via free space.

19. An apparatus comprising:
a photonic integrated circuit comprising:
means for receiving an outgoing data stream;
means for dividing the outgoing data stream to generate multiple first electromagnetic signals in multiple channels;
means for altering at least some of the first electromagnetic signals in at least some of the channels to generate scrambled electromagnetic signals;
means for combining the scrambled electromagnetic signals to generate one or more outgoing scrambled combined electromagnetic signals;
means for transmitting, via a first fog interface of the apparatus, the one or more outgoing scrambled combined electromagnetic signals to a second fog interface of a second apparatus; and
means for receiving, via the first fog interface, one or more incoming scrambled combined electromagnetic signals from the second apparatus;
wherein the means for combining are further configured to divide the one or more incoming scrambled combined electromagnetic signals and generate multiple second electromagnetic signals in the multiple channels;
wherein the means for altering are further configured to modify at least some of the second electromagnetic signals in at least some of the channels and generate descrambled electromagnetic signals;
wherein the means for dividing are further configured to combine the descrambled electromagnetic signals and generate an incoming data stream;

wherein the means for receiving are further configured to transmit the incoming data stream;

wherein the outgoing data stream comprises an outgoing optical data stream; and wherein the photonic integrated circuit comprises a micro-ring resonator configured to operate as a phase-based modulator/demodulator.

20. The apparatus of claim 19, wherein the means for transmitting are configured to transmit the one or outgoing scrambled combined electromagnetic signals to the second fog interface via free space.

* * * * *